(12) United States Patent  (10) Patent No.: US 8,282,906 B2
Katare et al.  (45) Date of Patent: Oct. 9, 2012

(54) REMOTE PLASMA SYNTHESIS OF METAL OXIDE NANOPARTICLES

(75) Inventors: Rajesh K. Katare, Cottage Grove, MN (US); Moses M. David, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 158 days.

(21) Appl. No.: 12/971,414

(22) Filed: Dec. 17, 2010

(65) Prior Publication Data

US 2011/0150752 A1 Jun. 23, 2011

Related U.S. Application Data

(60) Provisional application No. 61/289,470, filed on Dec. 23, 2009.

(51) Int. Cl.
*C01G 23/047* (2006.01)

(52) U.S. Cl. ......... 423/610; 977/773; 977/775; 977/776

(58) Field of Classification Search ................... 423/610; 977/773, 775, 776
See application file for complete search history.

(56) References Cited

U.S. PATENT DOCUMENTS

| | | | |
|---|---|---|---|
| 5,147,678 A | 9/1992 | Foerch | |
| 5,749,937 A | 5/1998 | Detering | |
| 5,958,361 A | 9/1999 | Laine | |
| 6,095,085 A | 8/2000 | Agarwal | |
| 6,153,529 A | 11/2000 | Agarwal | |
| 6,254,940 B1 | 7/2001 | Pratsinis | |
| 6,329,058 B1 | 12/2001 | Arney | |
| 6,432,526 B1 | 8/2002 | Arney | |
| 6,676,802 B2 | 1/2004 | Roth | |
| 7,081,234 B1 | 7/2006 | Qi | |
| 7,161,112 B2 | 1/2007 | Smith | |
| 7,169,375 B2 | 1/2007 | Chisholm | |
| 7,217,407 B2 | 5/2007 | Zhang | |
| 7,232,556 B2 * | 6/2007 | Yadav | 423/592.1 |
| 7,332,556 B2 | 2/2008 | Cecchin | |
| 7,357,910 B2 | 4/2008 | Phillips | |
| 2005/0119398 A1 | 6/2005 | Zhang | |
| 2007/0272299 A1 | 11/2007 | Schuss | |
| 2008/0070801 A1 | 3/2008 | Xiang | |
| 2008/0302652 A1 | 12/2008 | Entley | |
| 2011/0159273 A1 * | 6/2011 | Lukowski et al. | 428/323 |

FOREIGN PATENT DOCUMENTS

WO  WO 2006/060827  6/2006

(Continued)

OTHER PUBLICATIONS

Li et al., "Phase structure and luminescence Properties of Eu3+-Doped TiO2 Nanocrystals Synthesized by Ar/O2 Radio Frequency Thermal Plasma Oxidation of Liquid Precursor Mists" J. Phys. Chem. B. 2006, 110, 1121-1127.*

(Continued)

*Primary Examiner* — Colleen Dunn
*Assistant Examiner* — Anthony J Zimmer
(74) *Attorney, Agent, or Firm* — Stephen L. Crooks

(57) ABSTRACT

A method of synthesizing nanoparticles, comprising providing a precursor comprising a titanium alkoxide compound; forming a plasma from oxygen gas at a first location, wherein the plasma comprises plasma products that contain oxygen atoms; causing the plasma products to flow to a second location remote from the first location; contacting the precursor with the plasma products at the second location so as to oxidize the precursor and form nanoparticles; and collecting the nanoparticles with a collector.

6 Claims, 2 Drawing Sheets

FOREIGN PATENT DOCUMENTS

| WO | WO 2007/075509 | 7/2007 |
| --- | --- | --- |
| WO | WO 2007/141244 | 12/2007 |
| WO | WO 2008/091581 | 7/2008 |
| WO | WO 2009062608 A1 * | 5/2009 |
| WO | WO 2010/114826 | 10/2010 |

OTHER PUBLICATIONS

Gudmundsson, "Electronegativity of low-pressure high-density oxygen discharges", J. Physics D: Applied Physics, vol. 34 (2001), pp. 1100-1109.

Inagaki, "Surface modification of poly (aryl ether ether ketone) film by remote oxygen plasma", J. Appl. Polym. Sci., vol. 68, (1998), pp. 271-279.

Inagaki, "Comparative studies on surface modification of poly(ethylene terephthalate) by remote and direct argon plasmas", J. Appl. Polym. Sci., vol. 79, (2001), pp. 808-815.

Yamada, "Surface modification of poly(tetrafluoroethylene) by remote hydrogen plasma", Macromolecules, vol. 29, (1996), pp. 4331-4339.

* cited by examiner

US 8,282,906 B2

REMOTE PLASMA SYNTHESIS OF METAL OXIDE NANOPARTICLES

CROSS REFERENCE TO RELATED APPLICATION

This application claims the benefit of U.S. Provisional Patent Application No. 61/289,470, filed Dec. 23, 2009, the disclosure of which is incorporated by reference herein in its entirety.

FIELD OF THE INVENTION

The present invention relates to a method of making metal oxide nanoparticles, more particularly titanium dioxide-containing nanoparticles, using a remote plasma reactor.

BACKGROUND

Metal oxide nanoparticles are useful for a variety of applications, including increasing the refractive indices of transparent organic matrices.

Various methods have been taught for the production of metal oxide nanoparticles with control of particle size and particle size distribution. For example, U.S. Pat. No. 7,169,375 (Chisolm) discloses a method of making metal oxide nanoparticle sols by hydrolyzing metal alkoxides.

U.S. Pat. Nos. 6,329,058 and 6,432,526 (Amey et al.) describe methods for making metal oxide nanoparticles from metal alkoxides via complexation and hydrolysis.

Metal oxide nanoparticles have been synthesized in a plasma reactor. U.S. Pat. No. 5,749,937 (Detering et al.) discloses a Fast Quench Reactor and Method for the conversion of titanium tetrachloride vapor to an ultrafine powder of titanium dioxide under plasma conditions.

U.S. Pat. No. 7,217,407 to Zhang purportedly describes a plasma synthesis method of increasing particle surface area and decreasing the concentration of over-sized particles in a process for making metal oxide particles.

SUMMARY

Herein are disclosed apparatus and methods that can be used to synthesize metal oxide nanoparticles, with control of particle size, by using a remote plasma.

Although there are a number of documents that describe the use of plasma techniques for the preparation of nanoparticles, there is no known technique for using a remote plasma to generate plasma products from oxygen gas and then contacting those oxygen-containing plasma products with a metal alkoxide precursor material, remote from the plasma generation location, to obtain metal oxide nanoparticles. It was not expected that this combination of remotely generated oxygen-containing plasma products with metal oxides would afford nanoparticles where, in some instances, greater than 98 percent by volume of the nanoparticles had largest dimensions in the 8 to 12 nanometer range. The present invention provides a new method of making metal oxide nanoparticles, which method comprises: providing a precursor comprising a titanium alkoxide compound; forming a plasma from oxygen gas at a first location, wherein the plasma comprises plasma products that contain oxygen atoms; causing the plasma products to flow to a second location remote from the first location; contacting the precursor with the plasma products at the second location so as to oxidize the precursor and form nanoparticles; and collecting the nanoparticles in a collector. The second location may be a reaction chamber joined to the first location by a conduit having a length of 2 to 300 centimeters, and the plasma products travel from the first location, through the conduit, prior to contacting the precursor in the reaction chamber. The nanoparticles may comprise titanium dioxide. The precursor may comprise titanium tetraisopropoxide.

In some embodiments, at least 50 percent by volume of the nanoparticles may have a particle size in the range of 2 to 100 nanometers. In other embodiments, at least 90 percent by volume of the nanoparticles have a particle size in the range of 8 to 12 nanometers. In other embodiments, at least 98 percent by volume of the nanoparticles have a particle size in the range of 8 to 12 nanometers.

These and other aspects of the invention will be apparent from the detailed description below. In no event, however, should the above summaries be construed as limitations on the claimed subject matter, which subject matter is defined solely by the attached claims, as may be amended during prosecution.

GLOSSARY

"nanoparticles" means particles having an average particle diameter of about 1 to about 100 nm;
"plasma" means an ionized gas;
"plasma products" or "products of the plasma" mean molecular fragments (and combinations thereof) of the molecules subjected to the plasma;
"size" means the diameter of a spherical particle or the largest dimension of an irregularly shaped particle.

Like reference numbers in the various figures indicate like elements. Some elements may be present in identical multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted. In particular, in some embodiments certain components may be present in interchangeable and/or identical multiples (e.g., pairs). For these components, the designation of "first" and "second" may apply to the order of use, as noted herein (with it being irrelevant as to which one of the components is selected to be used first).

DETAILED DESCRIPTION

Figure 1:
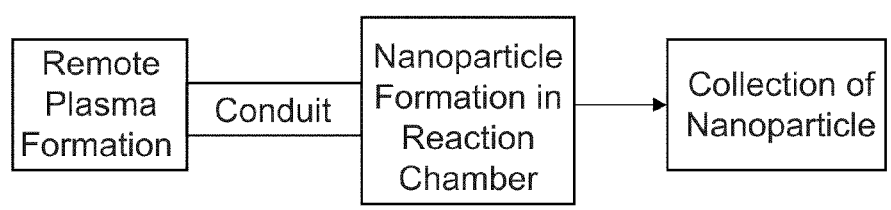
FIG. 1 is a schematic representation of a method of making metal oxide nanoparticles of the present disclosure.

FIG. 1 illustrates an example of steps that may be used to make metal oxide nanoparticles that have a relatively uniform size distribution, of a desired range. To create such nanoparticles, a plasma may be formed at a location remote from a reaction chamber where nanoparticles are formed. A gas is supplied to the plasma generation zone for formation of the plasma. When the supplied gas is oxygen ($O_2$), or a mixture of oxygen and argon, the plasma that is formed contains reactive oxygen-containing plasma products. As illustrated, the zone where the plasma is formed is connected via a conduit to a reaction chamber where oxygen-containing plasma products are brought into contact with an appropriate precursor material to react and form metal oxide nanoparticles. The separation of the plasma generation from the precursor treatment zone allows for process control by independent optimization of the plasma formation and the precursor treatment steps. The plasma may be created using known remote plasma sources including Litmas® machines from Advanced Energy Industries, Inc. of Fort Collins, Colo. Examples of suitable remote plasma devices from Advanced Energy include the Litmas® RPS1501 and 3001 remote plasma source products. These devices are suited to deliver reactive gas species and thus may be used to create oxygen atom-containing plasma products in accordance with the present invention. Other reliable sources for creating oxygen gas species include Astron® plasma machines from MKS Instruments Inc. Once the plasma is created, the plasma products can be delivered via a conduit to the reaction chamber. The reaction chamber lacks any substantial exposure to the energy source provided in the zone where the plasma is generated, and there is no need to apply an additional energy source in the reaction chamber. The reaction chamber is an evacuated chamber into which a precursor material is introduced for reaction with remotely generated plasma products. The plasma products that contain the reactive species enter the reaction chamber whereby rapid reaction occurs with the precursor, to form nanoparticles. As the reaction proceeds, metal oxide nanoparticles form. Control of the distribution of particle size of the metal oxide nanoparticles so formed may be achieved by independent optimization of the plasma formation and the precursor treatment steps. Parameters that may be optimized to control the growth of nanoparticles include, for example, the power level of the plasma generator (for example, in the range of 6 kW-10 kW), the mixture of gases (for example, argon and oxygen) supplied to the plasma generator, the system pressure (0.1 Torr to about 10 Torr or higher; a typical pressure would be about 1 Torr), and the rate at which precursor material is introduced to the reaction chamber. The formation of nanoparticles in the reaction chamber may optionally be quenched by the introduction of a suitable quenching gas, for example argon, nitrogen, or compressed air. The nanoparticles that are formed may be collected using a particle collection device such as a HEPA filter or an electrostatic precipitator.

Figure 2:
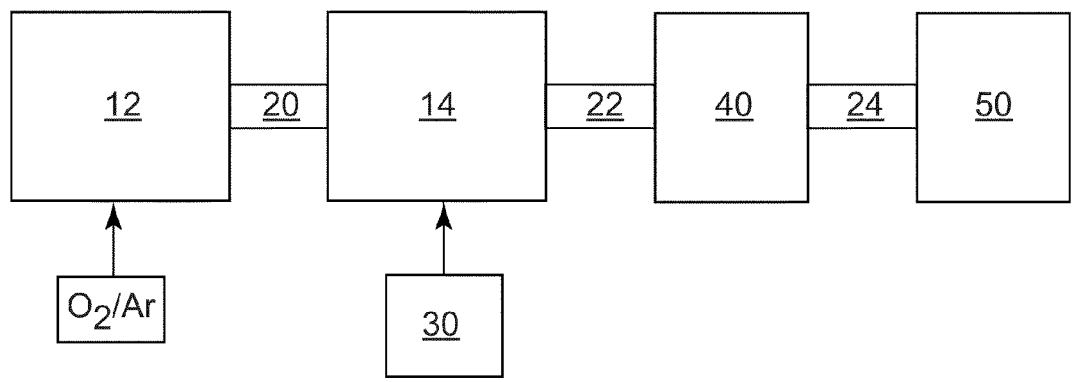
FIG. 2 is a schematic representation of a system for making metal oxide nanoparticles of the present disclosure.

FIG. 2 schematically illustrates an example of a remote plasma system 10 that comprises a plasma source 12 and a reaction chamber 14. Plasma products flow from the plasma source 12 to the chamber 14 via a conduit 20. The conduit 20 may be a simple pipe or a series of pipes and elbows that effectively enable the plasma products to be delivered to the chamber interior 14. The plasma products may be delivered to the reaction chamber interior at a rate of, for example, 10 liters per minute (L/min.), depending on the size of the system. The conduit and reaction chamber may be made from materials that are suitable to operate in the plasma product environment. Such materials typically are thermally stable and noncorrosive and may be made from aluminum, stainless steel, nickel, fluoropolymers, or other materials suitable to survive the environment and permit the delivery of plasma products to the reaction chamber. Typically, the reaction chamber is water-cooled to remove excess heat. Reaction of the plasma products with precursor material 30 may be carried out at a reduced pressure, in the range of about 0.1 to 40 Torr, or in some embodiments, in the range of about 1 to 10 Torr A vacuum pump 50 is associated with the system to uniformly maintain inner pressure of the reaction chamber so that the plasma products react most effectively with a precursor material 30. A nanoparticle collector 40 may be provided, to enable collection of metal oxide nanoparticle products. Non-limiting examples of nanoparticle collectors include HEPA filters and electrostatic particle collectors. Conduit 22 may be provided to allow gaseous materials and nanoparticles to flow from the reaction chamber to the nanoparticle collector. A quenching region (not shown) may be provided downstream from the reaction chamber to allow introduction of a quenching gas, such as argon, nitrogen or compressed air, in order to terminate the growth of nanoparticles. The vacuum pump 50 may assist in providing an overall flow of materials through the system, via a conduit 24, as well as discharging materials other than those collected on the nanoparticle collector.

Remote Plasma Gas

In some embodiments, the gas that is supplied for remote plasma formation is oxygen. The remote plasma that is formed from oxygen gas may be a low-pressure high-density oxygen discharge, which may include various oxygen-containing plasma products. For a discussion of low-pressure high-density oxygen discharges, see Gudmundsson et al., J. Phys. D: Appl. Phys. 34 (2001) 1100-1109. The oxygen gas may be used in combination with argon gas to facilitate plasma formation, where argon may serve as a transfer gas. Typically, the remote plasma generator is turned on using argon as the plasma gas, and oxygen is introduced after plasma generation has been initiated. Suitable ratios of argon:oxygen pressures may be in the range of about 10:90 to about 80:20; a non-limiting exemplary ratio of argon:oxygen pressures is about 50:50.

Prescursor Material

Metal oxide particles of the present disclosure are derived from metal alkoxides having the formula (I) where M is a metal, A is an alkoxide ligand, and X represents the number of alkoxide ligands bound to M.

$$M(A)_x \qquad (I)$$

Some suitable metal alkoxides used to make the metal oxide particles of the present disclosure have an "M" consisting of titanium. Ligand "A" may include various alkoxides, organic chelating groups, halides, amine-containing ligands, or combinations thereof. Typically, "A" is selected from the group consisting of 1-butoxide, 2-ethylhexoxide, 2-methoxy-1-ethoxide, linear and branched alkoxides (for example, ethoxide, 1-propoxide, 2-propoxide, 2-butoxide, iso-butoxide, tert-butoxide, and hexoxide). Two or more of the same or different alkoxide ligands may be attached to "M." Typically, "x" is 4 when "M" is titanium. In some embodiments, when "M" is titanium, "A" is 2-propoxide. The metal alkoxides used to make the discrete, uniform, organophilic, metal oxide particles of the present invention may be purchased commercially or synthesized within the laboratory. For example, titanium tetraisopropoxide is available as Tyzor TPT liquid organic titanium (DuPont, Wilmington Del.). The precursor material may be introduced to the reaction chamber as a nebulized liquid. A typical droplet size would include 1.7 micron droplets.

Nanoparticles

In general, the metal oxide nanoparticles of the present disclosure may have a particle size greater than about 2 nanometers and less than about 100 nanometers, or in some exemplary embodiments may range in size greater than about 8 nanometers and less than about 12 nanometers. The distribution of particle size may be such that more than 50 percent by volume, more than 90 percent by volume, or, in some exemplary embodiments, more than 98 percent by volume of the nanoparticles have a particle size in the range of from about 8 nanometers to about 12 nanometers. The metal oxide nanoparticles may be loosely agglomerated into chunks of 100 to 200 nanometers, or even up to 50 microns. The determination of nanoparticle size distributions may be conveniently carried out by means of scanning electron microscopy (SEM—see FIG. 3 & FIG. 4).

In further describing the embodiments of the invention, a first method is provided for synthesizing nanoparticles, including the steps of:
    providing a precursor comprising a titanium alkoxide compound;
    forming a plasma from oxygen gas at a first location, wherein the plasma comprises plasma products that contain oxygen atoms;
    causing the plasma products to flow to a second location remote from the first location;
    contacting the precursor with the plasma products at the second location so as to oxidize the precursor and form nanoparticles; and
    collecting the nanoparticles in a collector.

A second method is provided that can have all of the features of the first method. In the second method, the second location is a reaction chamber joined to the first location by a conduit having a length of 2 to 300 centimeters, and the plasma products travel from the first location, through the conduit, prior to contacting the precursor in the reaction chamber.

A third method is provided that can have all of the features of the first or second methods. In the third method, the nanoparticles comprise titanium dioxide.

A fourth method is provided that can have all of the features of the first through third methods. In the fourth method, the precursor comprises titanium tetraisopropoxide.

A fifth method is provided that can have all of the features of the first through fourth methods. In the fifth method, at least 50 percent by volume of the nanoparticles have a particle size in the range of 2 to 100 nanometers.

A sixth method is provided that can have all of the features of the first through fifth methods. In the sixth method, at least 90 percent by volume of the nanoparticles have a particle size in the range of about 8 to 12 nanometers.

A seventh method is provided that can have all of the features of the first through fifth methods. In the seventh method, at least 98 percent by volume of the nanoparticles have a particle size in the range of about 8 to 12 nanometers.

Additional embodiments are also described in the following non-limiting example.

EXAMPLE

Apparatus

A high density oxygen plasma was generated using an 8 KW AE remote plasma generator (Advanced Energy Industries, Inc., Fort Collins, Colo.).

For the reported remote plasma experiments, the reactor was typically evacuated to a base pressure of not greater than approximately 0.1 Torr. A 50:50 (equal pressure) mixture of oxygen and argon gases was then introduced to the remote plasma source at total flow rate of 10 liters/minute, which produced a steady pressure of approximately 1 Torr during the execution of each experiment.

Figure 3:
FIG. 3 is a photomicrograph of metal oxide nanoparticles of the present disclosure.
Figure 4:
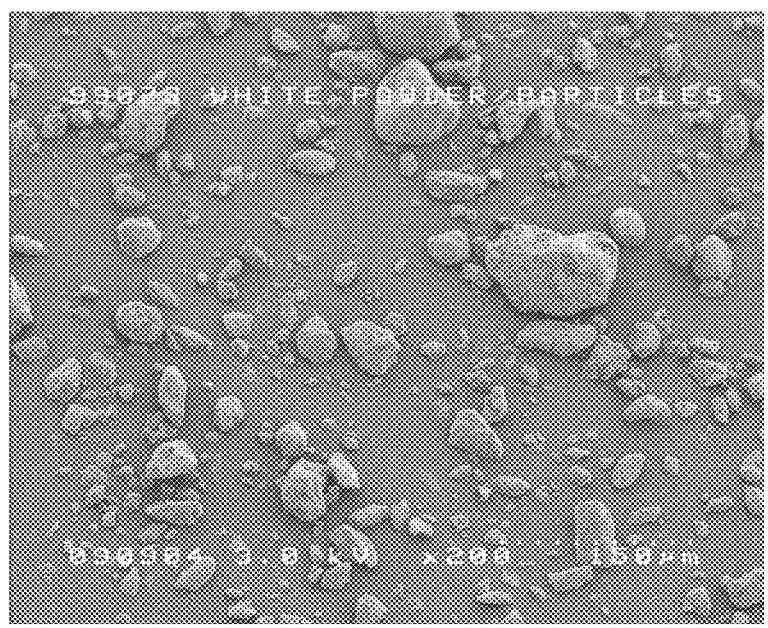
FIG. 4 is a photomicrograph of loosely agglomerated metal oxide nanoparticles of the present disclosure.

Remote Plasma Nanoparticle Synthesis. Tyzor TPT (liquid titanium isopropoxide, DuPont, Wilmington, Del.) was nebulized using a 241PG Particle Generator (Sonaer, Farmindale, N.Y.) to generate droplets of about 1.7 micron diameter, and the nebulized sample was introduced to the reaction chamber at a rate of about 5 $cm^3$/min. along with an argon carrier gas flowing at 2 L/min., where the nebulized sample encountered the oxygen plasma products from the remote plasma generator. The nanoparticles which formed were collected on a HEPA filter, and subsequently examined by scanning electron microscopy (SEM). FIG. 3 shows an SEM micrograph, where >98% of the nanoparticles were observed to be in the range of about 8 to 12 nanometers. FIG. 4 shows an SEM micrograph of the loosely agglomerated nanoparticles, where the loose agglomerates are "chunks" of about 100 nanometers to 200 nanometers (and nanoparticle diameter is about 10 nanometers).

Various embodiments of the invention have now been described in sufficient detail for those of ordinary skill in the art to understand. While the embodiments have been fully disclosed, it will be appreciated that changes or modifications to the described embodiments may be made without departing from the true spirit and scope of the invention, as set forth in the appended claims.

What is claimed is:

1. A method for synthesizing nanoparticles, which method comprises:
    forming a plasma from oxygen gas at a first location, wherein the plasma comprises plasma products that contain oxygen atoms;
    causing the plasma products to flow to a second location;
    contacting a precursor comprising a titanium alkoxide compound with the plasma products at the second location so as to oxidize the precursor and form nanoparticles; and
    collecting the nanoparticles;
    wherein the second location is a reaction chamber;
        wherein the reaction chamber and the first location are joined by a conduit having a length of 2 to 300 centimeters; and
    wherein the plasma products travel from the first location, through the conduit, prior to contacting the precursor in the reaction chamber.

2. The method of claim 1, wherein the nanoparticles comprise titanium dioxide.

3. The method of claim 1, wherein the precursor comprises titanium tetraisopropoxide.

4. The method of claim 1, wherein at least 50 percent by volume of the nanoparticles have a particle size in the range of 2 to 100 nanometers.

5. The method of claim 1, wherein at least 90 percent by volume of the nanoparticles have a particle size in the range of 8 to 12 nanometers.

6. The method of claim 1, wherein at least 98 percent by volume of the nanoparticles have a particle size in the range of 8 to 12 nanometers.

* * * * *

UNITED STATES PATENT AND TRADEMARK OFFICE
CERTIFICATE OF CORRECTION

PATENT NO. : 8,282,906 B2
APPLICATION NO. : 12/971414
DATED : October 9, 2012
INVENTOR(S) : Rajesh Katare et al.

It is certified that error appears in the above-identified patent and that said Letters Patent is hereby corrected as shown below:

Column 1
Line 26, delete "(Chisolm)" and insert -- (Chisholm) --, therefor.
Line 28, delete "Amey" and insert -- Arney --, therefor.

Column 2
Line 52, delete "bottom"," and insert -- "bottom", --, therefor.
Line 52, delete "lower"," and insert -- "lower", --, therefor.

Column 4
Line 38, delete "Prescursor" and insert -- Precursor --, therefor.

Column 6
Line 8, delete "Farmindale," and insert -- Farmingdale, --, therefor.

Signed and Sealed this
Twelfth Day of February, 2013

Teresa Stanek Rea
*Acting Director of the United States Patent and Trademark Office*